United States Patent
Oh (10) Patent No.: US 11,682,068 B2
(45) Date of Patent: Jun. 20, 2023

(54) AUTOMATING THE CREATION OF LISTINGS USING AUGMENTED REALITY COMPUTER TECHNOLOGY

(71) Applicant: Mercari, Inc., Palo Alto, CA (US)

(72) Inventor: Byong Mok Oh, Los Altos, CA (US)

(73) Assignee: MERCARI, INC., Palo Alto, CA (US)

( * ) Notice: Subject to any disclaimer, the term of this patent is extended or adjusted under 35 U.S.C. 154(b) by 262 days.

(21) Appl. No.: 16/773,177

(22) Filed: Jan. 27, 2020

(65) Prior Publication Data

US 2021/0082037 A1 Mar. 18, 2021

Related U.S. Application Data

(60) Provisional application No. 62/900,764, filed on Sep. 16, 2019.

(51) Int. Cl.
*G06Q 30/00* (2012.01)
*G06Q 30/0601* (2023.01)
(Continued)

(52) U.S. Cl.
CPC ....... *G06Q 30/0643* (2013.01); *G06F 16/906* (2019.01); *G06N 20/00* (2019.01);
(Continued)

(58) Field of Classification Search
None
See application file for complete search history.

(56) References Cited

U.S. PATENT DOCUMENTS 9,183,583 B2 11/2015 Lin et al.
9,747,622 B1 * 8/2017 Johnson ............. G06Q 30/0601
(Continued)

OTHER PUBLICATIONS

No Author "5 Significant Benefits of Machine Learning in Business" Teksun Medium, Mar. 6, 2018. Retrieved from https://medium.com/@TeksunGroup/5-significant-benefits-of-machine-learning-in-business-a3c5d743d6fc (Year: 2018).*
(Continued)

*Primary Examiner* — Naeem U Haq
(74) *Attorney, Agent, or Firm* — Sterne, Kessler, Goldstein & Fox, P.L.L.C.

(57) ABSTRACT

Provided herein are system, apparatus, article of manufacture, method and/or computer program product embodiments, and/or combinations and sub-combinations thereof, for using computer technology to automate the creation of consistent, high quality listings for selling "for sale objects" (FSO) on an ecommerce site. Some embodiments are configured to or operate by: identifying a category of a FSO; accessing templates for the category from a template database; navigating a user through a computer generated augmented reality (AR) environment using the templates to generate images of the FSO; analyzing one or more of the images to determine characteristics of the FSO; and generating a listing for the FSO using the images and the characteristics. In some embodiments, the templates were generated from certain past listings of the category from a historical database, and wherein the certain past listings were selected based on one or more of: price achieved, time to sell, buyer feedback, sellability score, and/or difference between initial offer price and final selling price.

17 Claims, 8 Drawing Sheets

(51) Int. Cl.

| | | |
|---|---|---|
| *G06F 16/906* | (2019.01) | |
| *G06T 19/00* | (2011.01) | |
| *G06T 7/00* | (2017.01) | |
| *G06N 20/00* | (2019.01) | |
| *G06T 11/00* | (2006.01) | |
| *G06V 10/764* | (2022.01) | |
| *G06V 20/20* | (2022.01) | |
| *G06V 20/62* | (2022.01) | |

(52) U.S. Cl.
CPC ............ *G06T 7/0002* (2013.01); *G06T 11/00* (2013.01); *G06T 19/003* (2013.01); *G06T 19/006* (2013.01); *G06V 10/764* (2022.01); *G06V 20/20* (2022.01); *G06V 20/63* (2022.01)

(56) References Cited

U.S. PATENT DOCUMENTS

| | | | |
|---|---|---|---|
| 10,255,703 | B2 | 4/2019 | Gonzales |
| 10,637,584 | B1 | 4/2020 | Palmer et al. |
| 11,341,550 | B2 | 5/2022 | Schubert et al. |
| 2005/0234804 | A1* | 10/2005 | Fang ............... G06Q 40/04 705/37 |
| 2013/0106910 | A1* | 5/2013 | Sacco ............... G06Q 30/0261 345/633 |
| 2014/0146082 | A1* | 5/2014 | So ............... G06V 20/20 345/633 |
| 2014/0337174 | A1* | 11/2014 | Lin ............... G06Q 30/0269 705/26.61 |
| 2017/0163882 | A1* | 6/2017 | Piramuthu ........... G06T 1/0007 |
| 2017/0286372 | A1 | 10/2017 | Chellam et al. |
| 2018/0181595 | A1 | 6/2018 | Inoue et al. |
| 2018/0197177 | A1 | 7/2018 | Lee et al. |
| 2019/0311301 | A1* | 10/2019 | Pyati ............... G06Q 30/0202 |
| 2019/0371068 | A1* | 12/2019 | Mavronicolas ..... G06F 3/04845 |
| 2020/0104866 | A1 | 4/2020 | Lagerling et al. |
| 2020/0104893 | A1 | 4/2020 | Schubert et al. |
| 2021/0201378 | A1* | 7/2021 | Piramuthu ............ G06F 16/583 |

OTHER PUBLICATIONS

No Author, "3 Retail Giants Who Used Augmented Reality to Sell", Augment Mar. 2016. Retreived from http://www.augment.com/blog/3-consumer-giants-who-used-augmented-reality-for-retail/ (Year: 2016).*

International Search Report and Written Opinion of the International Searching Authority directed to related International Application No. PCT/US2020/051066, dated Jan. 19, 2021; 8 pages.

* cited by examiner

AUTOMATING THE CREATION OF LISTINGS USING AUGMENTED REALITY COMPUTER TECHNOLOGY

CROSS-REFERENCE TO RELATED APPLICATIONS

This application claims priority to U.S. Provisional Appl. No. 62/900,764 titled "Automating The Creation Of Listings Using Augmented Reality Computer Technology," filed Sep. 16, 2019, which is herein incorporated by reference in its entirety.

BACKGROUND

Field

This disclosure is generally related to using an augmented reality system for automating the creation of listings for an ecommerce site.

Background

A number of ecommerce sites exist where users can sell their unwanted items, such as MERCARI, EBAY, AMAZON, POSHMARK, LETGO, CRAIGSLIST, etc. Conventionally, in order to sell on these sites, users must manually create listings for offering their items for sale. The quality of such listings can vary greatly, and may depend on a number of factors, such as the user's experience creating listings, the information the user has on the item (such as make, model, brand, size, color, features, etc.), the user's photo taking skills, whether the user is rushed when creating the listing, whether this is the first time the user has ever tried to sell an item of this type, etc. Since a well-constructed listing will increase the likelihood that the associated item will sell, it would be advantageous if computer technology could be employed to enhance and standardize the quality of listings.

SUMMARY

Provided herein are system, apparatus, article of manufacture, method and/or computer program product embodiments, and/or combinations and sub-combinations thereof, for using computer technology to automate the creation of consistent, high quality listings for selling "for sale objects" (FSO) on an ecommerce site. In an embodiment, the computer technology provides users with an augmented reality (AR) experience for creating the listings. The computer technology employs artificial intelligence (AI) and machine learning computing techniques, algorithms, methods, modules, components, software and/or other technology to enhance and improve the AR experience over time.

Some embodiments are configured to or operate by: identifying a category of a FSO; accessing templates for the category from a template database; navigating a user through a computer generated augmented reality (AR) environment using the templates to generate images of the FSO; analyzing one or more of the images to determine characteristics of the FSO; and generating a listing for the FSO using the images and the characteristics. In some embodiments, the templates were generated from certain past listings of the category from a historical database, and wherein the certain past listings were selected based on one or more of: price achieved, time to sell, buyer feedback, sellability score, and/or difference between initial offer price and final selling price.

Some embodiments may also be configured to or operate by: tracking the listing; and using information obtained from the tracking to improve the templates for the category using AI and ML technology.

Some embodiments may further be configured to or operate by: generating the templates for the category, wherein such templates are generated by: for the category, selecting successful listings from a historical database, wherein "successful" is defined using one or more of: price achieved, time to sell, buyer feedback, sellability score, and/or difference between initial offer price and final selling price; identifying common pictures in the selected listings; and generating the templates using the common pictures.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for using computer technology to automate the creation of consistent, high quality listings for selling "for sale objects" (FSO) on an ecommerce site. In an embodiment, the computer technology provides users with an augmented reality (AR) experience for creating the listings. The computer technology employs artificial intelligence (AI) and machine learning computing techniques, algorithms, methods, modules, components, software and/or other technology to enhance and improve the AR experience over time.

FSOs may be any item, product, object, article, thing, piece, component, sub-component, combination, merchandise, inventory, and/or service that a user wishes to sell via an ecommerce site. When selling items on the ecommerce site, the user is sometimes called a "seller." When buying items on the ecommerce site, the user is sometimes called a "buyer." It is noted that a given user can be, at different times, a buyer, a seller, or simultaneously a buyer and a seller.

Figure 1:
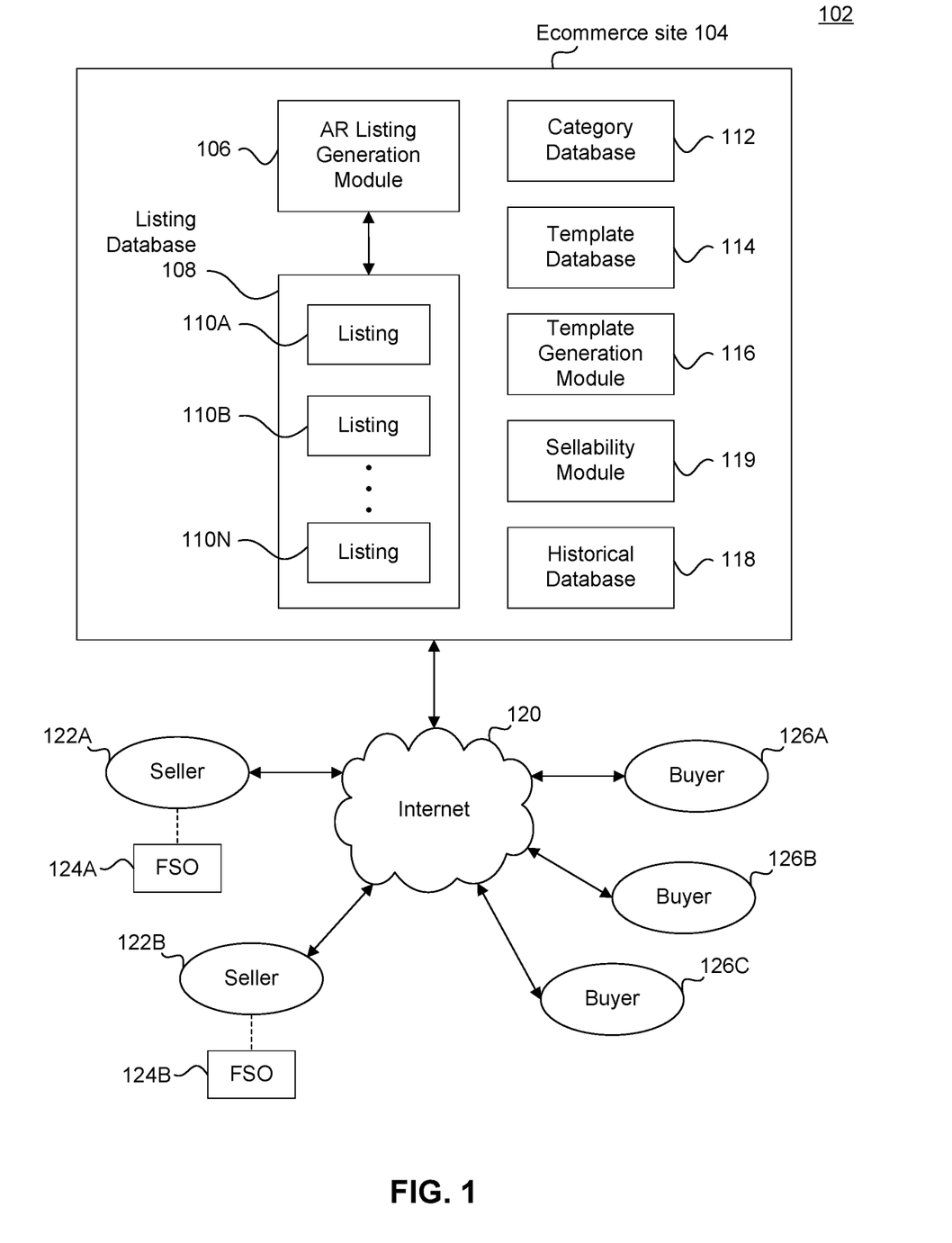
FIG. 1 illustrates a block diagram of a computing environment that includes an ecommerce site where users can buy and sell items and services, where such items/services are called herein "for sale objects" (FSO), according to some embodiments.

FIG. 1 illustrates a block diagram of a computing environment 102 that includes an ecommerce site 104 where sellers 122 can sell their FSOs 124, and buyers 126 can buy the FSOs 124, according to some embodiments. The sellers 122 and buyers 126 can access the ecommerce site 104 via the Internet 120.

The ecommerce site 104 may include a listing database 108 that stores a plurality of listings 110. The listings 110 may be created by sellers 122 to sell their respective FSOs 124 on the ecommerce site 104. To do so, according to some embodiments, the sellers 122 may interact with an augmented reality (AR) listing generation module 106, which enables sellers 122 to create more consistent, higher quality listings in an automated manner, irrespective of the knowledge, skill or experience of the sellers 122.

In some embodiments, the AR listing generation module 106 may operate with templates that are stored in a template database 114. The templates may be generated and updated by a template generation module 116.

The FSOs 124 may each be associated with a category, such as smartphone, APPLE MACBOOK, garden tool, men's belt, motorcycle, office desk, woman's purse, and comic books, to name just some examples. These categories are stored in a category database 112.

Each of the listings 110 may have a sellability score that was generated by a sellability module 119. Sellability score is a measure of how likely a given FSO 124 will sell on the ecommerce site 104. For example, the sellability score for a given FSO 124 may be a number between 0 and 1, with the number indicating how likely the FSO 124 will sell on the ecommerce site 104 within a given period of time.

Information that the sellability module 119 may use in generating the sellability score for a given FSO 124 can include information associated with the images in the associated listing 110, such as but not limited to the number of image(s), the quality of the image(s), etc.

Other information that the sellability module 119 may use in generating the sellability score can include a price associated with the FSO 124 (that is, the price that the FSO 124 is being offered for sale). For example, the sellability module 119 may compare the price to the Manufacturer's Suggested Retail Price (MSRP) of items similar to the FSO 124 in determining sellability score.

Additional information that the sellability module 119 may use in generating the sellability score can include description information in the listing 110 associated with the FSO 124.

Other information that the sellability module 119 may use in generating the sellability score can include the features associated with the FSO 124. Example features may include, but are not limited to, category, brand, make, model, manufacturer, configuration, customization, color, serial number, condition indicators (e.g., poor, used, like new, new), geographic location, etc.

The sellability module 119 may also consider other information when generating the sellability score for a FSO 124, such as (but not limited to) information associated with the seller 122 of the FSO 124.

Embodiments for generating and using sellability scores are further described in U.S. patent application Ser. No. 16/288,158 titled "Determining Sellability Score And Cancellability Score," filed Feb. 28, 2019, which is herein incorporated by reference in its entirety, and any of those embodiments may be used herein for the sellability module 119.

The ecommerce site 104 may include a database of historical information 118. The historical information 118 may store information pertaining to listings 110 that sold or did not sell, listings 110 that sold for the highest prices, listings 110 that sold in the shortest amounts of time, listings with the highest sellability scores (as determined by the sellability module 119), the original price and the sale price, descriptions of the associated FSOs 124 (such as make, model, brand, size, color, manufacturer, damage, year, etc.), the number of views of each listing 110, the number and amount of offers for each listing 110, as well as any other information included in the original listings 110 or tracked and collected by the ecommerce site 104 while the listings 110 were active (that is, prior to selling or cancellation) on the ecommerce site 104.

FIGS. 2A-2K illustrate examples of an AR experience provided by the AR listing generation module 106, to help sellers 122 create listings 110 to sell their respective FSOs 124 on the ecommerce site 104, according to some embodiments. This AR experience is a technological approach and solution to enable sellers 122 to, in an automated manner, create more consistent, higher quality listings 110 to enhance the likelihood that their FSOs 124 will sell on the ecommerce site 104.

Figure 2A:
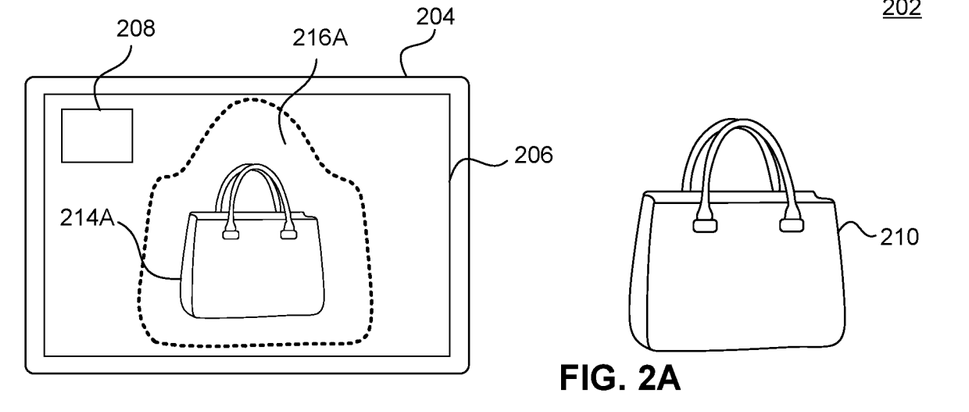
FIGS. 2A-2K collectively illustrate an augmented reality experience implemented using computer technology for facilitating the creation of consistent, high quality listings for selling FSOs on an ecommerce site, according to some embodiments.

FIG. 2A illustrates a woman's purse 210 which, for example purposes, seller 122A wishes to sell. Accordingly, purse 210 represents FSO 124A. Seller 122A wishes to create a listing 110 for the purse 210, in order to offer the purse 210 for sale on the ecommerce site 104. To this end, in some embodiments, the seller 122A points the camera app of her smartphone 204 (or other computer device having picture taking functionality and the capacity to run apps, such as notebook computers, tablets, wearables, Internet of Things (IOT) devices, appliances, etc.) at the purse 210. This is illustrated in the example of FIG. 2A, where an image 214A of the purse 210 is displayed in the camera display 206 of the smartphone 204.

In some embodiments, the AR listing generation module 106 may analyze the image 214A using image recognition techniques, algorithms, methods, modules, components, software and/or other technology to identify the category of the FSO 124A (that is, the purse 210). Example embodiments for automatically identifying the category of FSOs 124 is provided in U.S. patent application Ser. No. 16/288, 379 titled "Probabilistic Item Matching And Searching," filed Feb. 28, 2019, which is herein incorporated by reference in its entirety, and any of those embodiments may be used herein for automatically determining the category of FSOs 124.

Also or alternatively, the AR listing generation module 106 may provide a prompt in a window 208 that requests that the seller 122A provide the category of the FSO 124A the seller 122A wishes to sell, or confirm the category that was suggested by the AR listing generation module 106. The seller 122A may provide the category by using the keyboard of the smartphone 204 or via any other means, such as via voice input that is processed by speech recognition modules in the smartphone 204 (not shown). The category is one that is stored in the category database 112.

Once the category of the FSO 124A has been identified (which in this case may be "woman's handbag"), the AR listing generation module 106 may retrieve templates associated with the category from the template database 114. The templates are customized for each category, and may be used to navigate the seller 122A through an augmented reality (AR) experience to obtain high quality pictures of the FSO 124A that have been determined via historical information in the historical database 118 to be useful for selling FSOs 124 of the given category. These pictures can then be used to automatically create a listing 110 to sell the FSO 124A on the ecommerce site 104.

FIG. 2A illustrates a first template 216A. As noted above, the templates 216 are customized for each category. And, as shown in the example of FIG. 2A, the first template 216A is a two dimensional outline of the purse 210. This illustrates that the template 216A (as well as the other templates 216 shown in FIGS. 2B-2I) were generated so they are customized for the category of the FSO 124A. Generation of templates 216 will be described below with reference to FIG. 4.

Figure 2B:
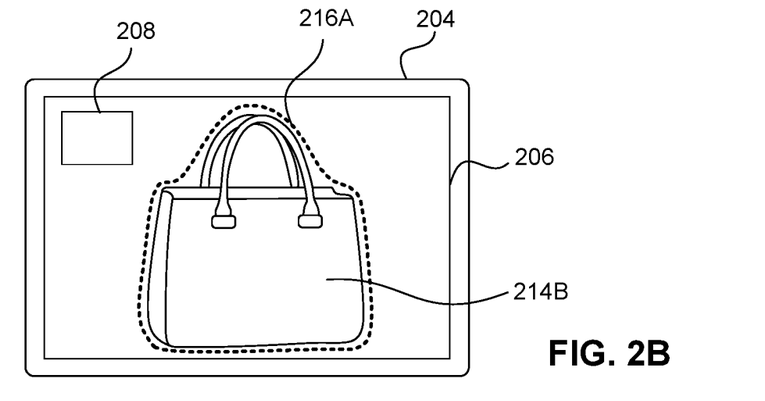

Still referring to FIG. 2A, the AR listing generation module 106 recognizes (through image processing techniques, algorithms, methods, modules, components, software and/or other technology) that the image 214A is smaller than the template 216A. Accordingly, the AR listing generation module 106 may provide instructions in the window 208 to the seller 122A to move closer to the purse 210 (or zoom in the picture). Upon the seller 122A taking this action, the image 214B of the purse 210 is as shown in FIG. 2B, wherein the size of the image 214B has been increased to more closely align with the boundary of the template 216A.

The AR listing generation module 106 may then instruct the seller 122A (via a message in window 208) to take the picture. Alternatively, upon detecting that the image 214B has substantially aligned with the boundary of the template 216A, the AR listing generation module 106 may command the camera app in the smartphone 204 to take the picture. In doing so, the AR listing generation module 106 may automatically adjust the camera settings (such as focus, shutter speed, aperture, ISO, white balance, flash, etc.) in order to take a high quality picture of the purse 210.

The AR listing generation module 106 may then continue to navigate the seller 122A through a series of templates 216 to take additional pictures of the purse 210. As noted above, the templates 216 are customized for each category. The templates 216 for a given category represent views of the FSO 124 that have been determined by the AR listing generation module 106 to be useful and effective for selling items of such category. In some embodiments, the AR listing generation module 106 may determine the views (that is, the templates 216) for a given category by analyzing listings 110 of that category that have sold in the past on the ecommerce site 104. Such "sold" listings 110 may be stored in the historical database 118. This operation is further described below with reference to FIG. 4.

Figure 2C:
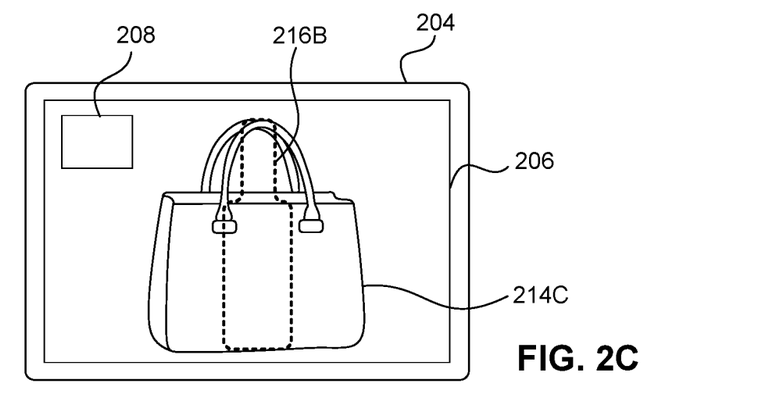

FIG. 2C illustrates a second example template 216B for the "woman's handbag" category. The second template 216B is a two dimension side view of a woman's handbag. The AR listing generation module 106 may instruct the seller 122A (via a message in the window 208) to rotate and position the purse 210 until the image 214C in the camera display 206 fits in the second template 216B.

Figure 2D:
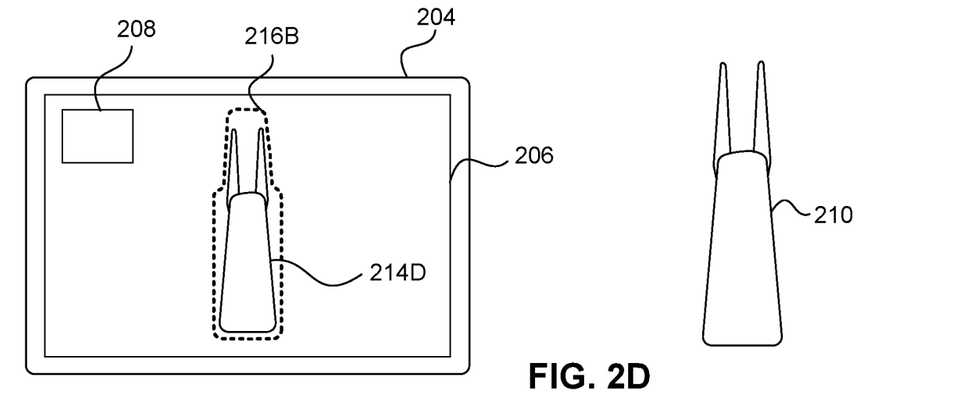

Upon the seller 122A taking this action, the image 214D of the purse 210 is as shown in FIG. 2D, wherein the purse 210 has been rotated and positioned so that the image 214D aligns with the second template 216B. The AR listing generation module 106 may then instruct the seller 122A (via a message in window 208) to take the picture. Alternatively, upon detecting that the image 214D has approached the boundary of the template 216B, the AR listing generation module 106 may command the camera app in the smartphone 204 to take the picture, as described above.

Figure 2E:
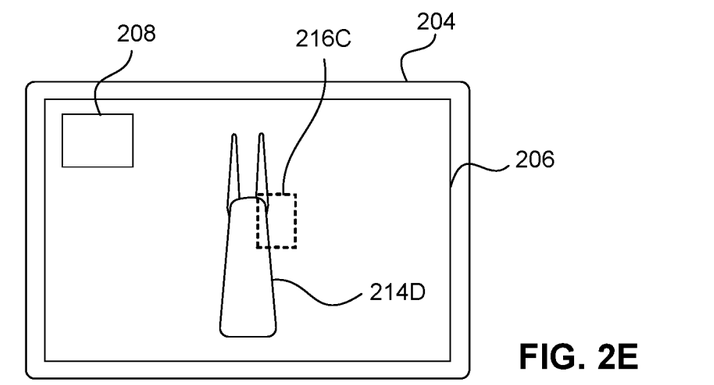

FIG. 2E illustrates a third example template 216C for the "woman's handbag" category. The purpose of the third template 216C may be to take a picture of the label 217 of the purse 210. Accordingly, the AR listing generation module 106 may instruct the seller 122A (via a message in the window 208) to open the purse 210 and position the smartphone 204 above the purse 210 so that the label 217 is within the third template 216C on the camera display 206.

Figure 2F:
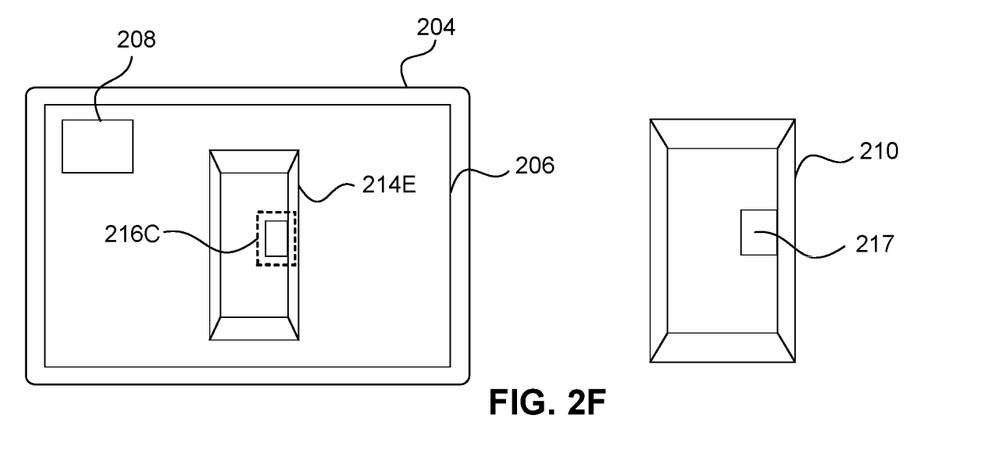

Upon the seller 122A taking this action, the image 214E of the purse 210 is as shown in FIG. 2F, wherein the label 217 of the purse 210 is within, and aligns with the third template 216C. The AR listing generation module 106 may then instruct the seller 122A (via a message in window 208) to take the picture. Alternatively, upon detecting the label 217 within the template 216C, the AR listing generation module 106 may command the camera app in the smartphone 204 to take the picture, as described above.

In some embodiments, the AR listing generation module 106 may use well known image processing and optical character recognition (OCR) techniques, algorithms, methods, modules, components, software and/or other technology to detect and recognize the information on the label 217. Such information may include the manufacturer, model, brand, designer, size, year and location of production, color, and/or other information pertaining to the FSO 124A (that is, the purse 210). The AR listing generation module 106 may include some or all of this information in the listing 110 for the FSO 124A.

Figure 2G:
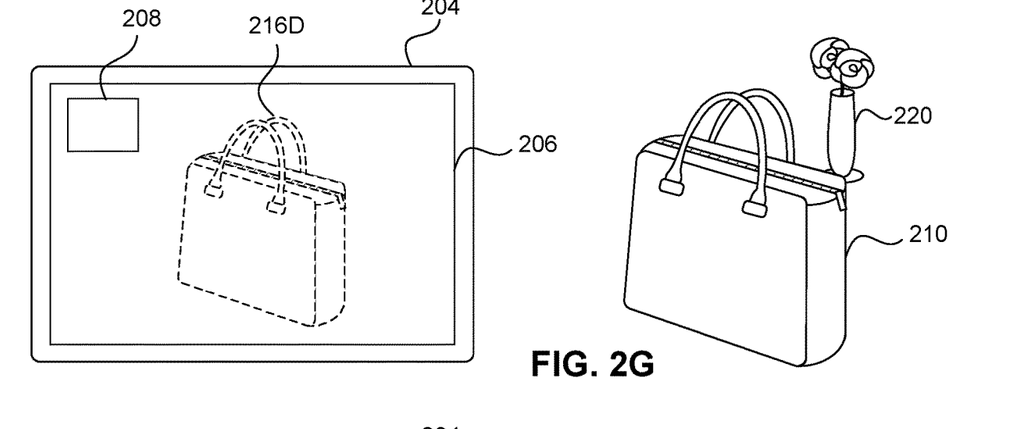

FIG. 2G illustrates a fourth example template 216D for the "woman's handbag" category. The fourth template 216D is a three dimension view of a woman's handbag. The AR listing generation module 106 may instruct the seller 122A (via a message in the window 208) to position either the smartphone 204 and/or the purse 210 until the image 214F in the camera display 206 aligns with the fourth template 216D.

Figure 2H:
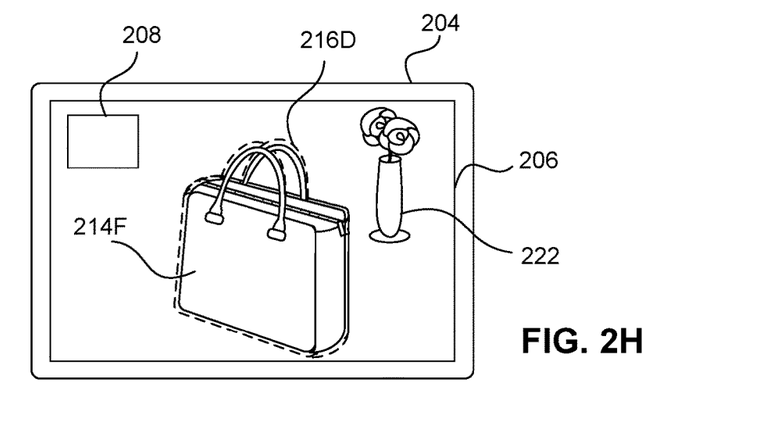

Upon the seller 122A taking this action, the image 214F of the purse 210 is as shown in FIG. 2H, wherein the smartphone 204 and/or purse 210 has been positioned so that the image 214F aligns with the fourth template 216D in the camera display 206. As shown in FIG. 2H, however, the camera display 206 also includes an image 222 of a flower in a vase 220. This flower image 222 represents items in the background (sometimes called herein "background noise") that may detract from the listing 110 being created.

In some embodiments, the AR listing generation module 106 may detect the presence of background noise by using well known image processing techniques, algorithms, methods, modules, components, software and/or other technology to detect if any high frequency image elements exist outside the current template (that is, outside the fourth template 216D). If any do exist, then the AR listing generation module 106 may conclude that the camera display 206 contains background noise. In this case, the AR listing generation module 106 may instruct the seller 122A (via a message in window 208) to remove any objects in the camera display 206 other than the FSO 124A. Additionally or alternatively, the AR listing generation module 106 may process the image in the camera display 206 to automatically remove background noise. This may be done using any appropriate image and/or filtering processing techniques, algorithms, methods, modules, components, software and/or other technology, such as through use of bilateral filter(s).

Figure 2I:
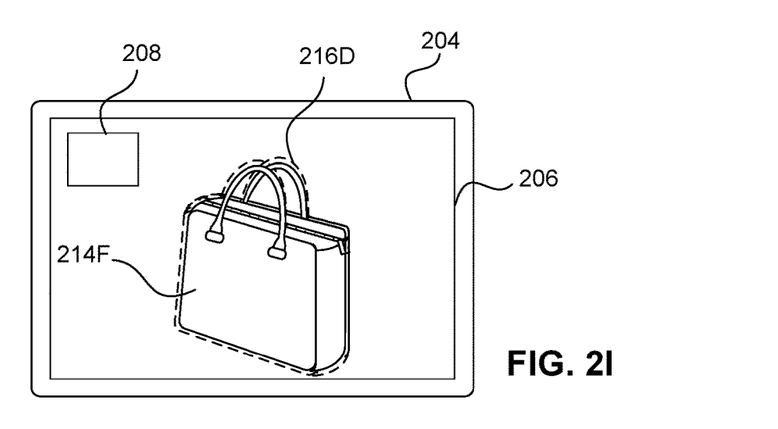

After background noise has been removed, the image 214F of the purse 210 is as shown in FIG. 2I. The AR listing generation module 106 may then instruct the seller 122A (via a message in window 208) to take the picture. Alternatively, the AR listing generation module 106 may command the camera app in the smartphone 204 to take the picture, as described above.

Figure 2J:
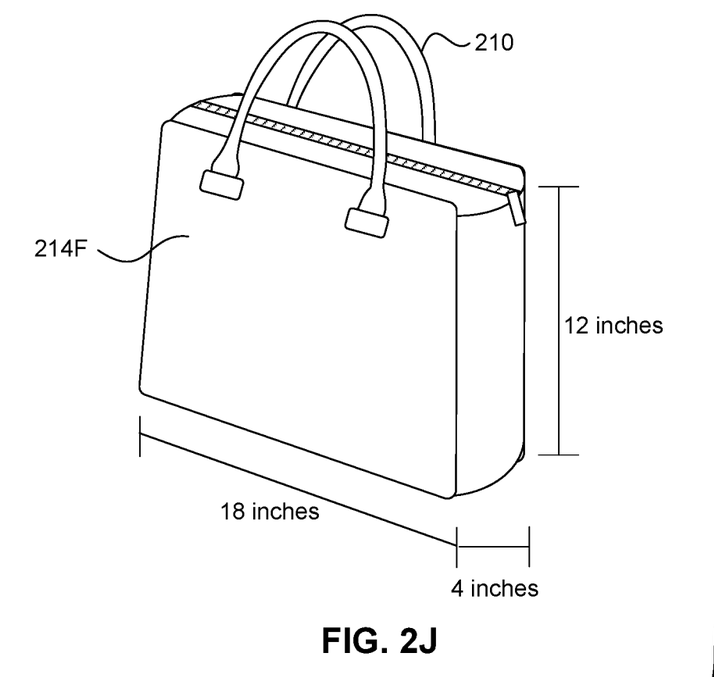
Figure 2K:
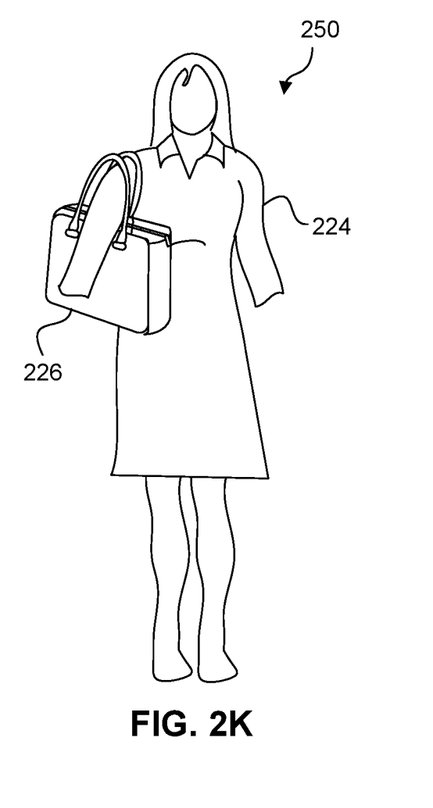

In some embodiments, the AR listing generation module 106 may use well known image processing techniques, algorithms, methods, modules, components, software and/or other technology to analyze the image 214F to determine the dimensions of the purse 210. An example of such well known technology is the APPLE MEASURE app. An example of such processing is shown in FIG. 2J, where the image 214F of the purse 210 has been annotated with dimensional information. The AR listing generation module 106 may include this annotated image 214F in the listing 110 for the purse 210.

Also or alternatively, the AR listing generation module 106 may create a new image 250 (see FIG. 2K) of a woman 224 holding the purse 210 (shown as 226). In this new image 250, the annotated image 214F from FIG. 2J has been scaled based on the dimensions of the purse 210 and an average sized woman 224. The AR listing generation module 106 may include this new image 250 in the listing 110.

Accordingly, by navigating the seller 122A through the templates 216 associated with the category of the FSO 124, the AR listing generation module 106 is able to obtain pictures and information pertaining to the FSO 124 for inclusion in the listing 110. As noted above, the templates 216 are customized for the category, and were determined by the AR listing generation module 106 to be useful and effective for selling items of such category. Accordingly, through use of innovative technology, this disclosure describes embodiments that are able to automatically generate listings 110 that are of consistent high quality irrespective of the seller 122's skill, knowledge and/or experience creating listings and/or other factors (described herein) that typically cause listings to be of inconsistent and/or low quality. As a result, sellers' are assured that their FSOs 124 have a greater likelihood of selling on the ecommerce site 104. Also, as will be appreciated by persons skilled in the relevant arts, because the templates 216 operate to superimpose computer-generated images on users' view of the real world, the AR listing generation module 106 uses computing technology to effectively generate an augmented reality environment for enabling the foregoing.

Figure 3:
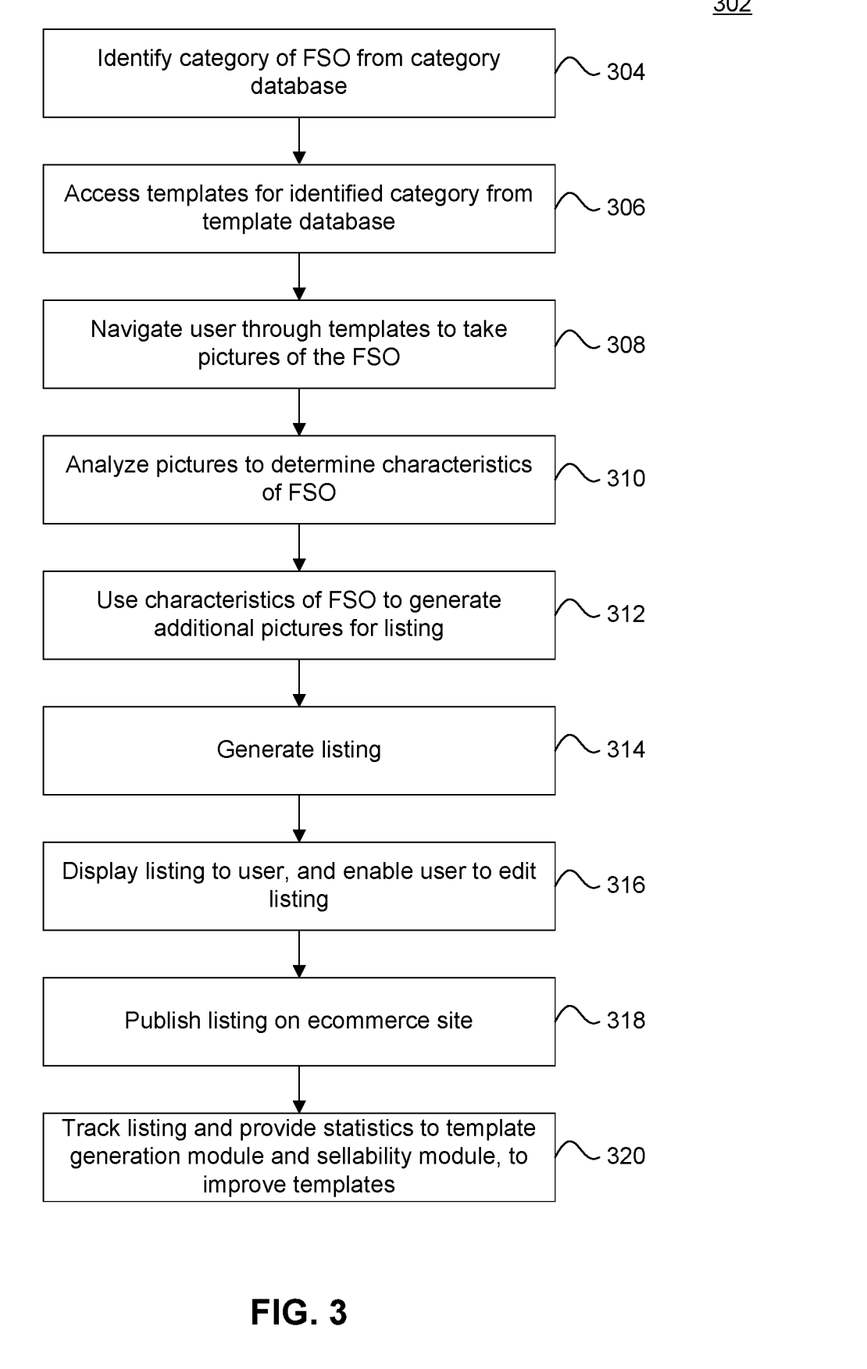
FIG. 3 illustrates a flowchart to automate the creation of consistent, high quality listings for selling FSOs via an augmented reality experience, according to some embodiments.

FIG. 3 illustrates a flowchart for a method 302 to automate the creation of consistent, high quality listings 110 for selling FSOs 124 via an augmented reality experience, according to some embodiments. Method 302 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 302 shall be described with reference to FIGS. 1 and 2A-2K. However, method 302 is not limited to those example embodiments.

In 304, the AR listing generation module 106 may identify the category of the FSO 124A that the seller 122A wishes to sell. In some embodiments, this may be achieved by the seller 122A taking a picture of the FSO 124A. Then, the AR listing generation module 106 may analyze the image 214A using image recognition techniques, algorithms, methods, modules, components, software and/or other technology to identify the category of the FSO 124A, as described above. For purposes of example, assume that the purse 210 in FIG. 2A is the FSO 124A.

In 306, the AR listing generation module 106 may access templates from the template database 114 associated with the identified category. As described above, the templates are customized for the identified category.

In 308, the AR listing generation module 106 may navigate the seller 122A through the templates to obtain high quality pictures of the FSO 124A. Examples of this are described above with respect to FIGS. 2A-2K.

In 310, the AR listing generation module 106 may analyze some or all of the pictures to obtain and determine characteristics of the FSO 124A, such as make, model, brand, size, color, manufacturer, damage, year, etc. For example, the AR listing generation module 106 may analyze the tag 217 of the purse 210, as described above with respect to FIGS. 2E and 2F. Also or alternatively, as indicated by 312, the AR listing generation module 106 may determine the dimensions of the FSO 124A and generate one or more images using the dimensional information (as described above with respect to FIGS. 2J and 2K).

In 314, the AR listing generation module 106 may automatically generate a listing 110 for the FSO 124A using the images and pictures generated in 308 and 312, and the information pertaining to the FSO 124A that was obtained in 310.

In some embodiments, the AR listing generation module 106 may also generate a suggested offer price for the FSO 124A, based on historical information of past listings of the same or similar FSOs 124, contained in the historical database 118. For example, the AR listing generation module 106 may use the average selling price of certain past listings as the suggested offer price, where the certain past listings are selected based on any combination of: highest selling price, shortest time to sell, number of offers, difference between initial offer price and final selling price, etc. Embodiments for generating suggested offer prices for FSOs 124 are described in U.S. Patent Applications titled "Inventory Ingestion And Pricing System," Ser. No. 16/288,203, filed Feb. 28, 2019, which is herein incorporated by reference in its entirety, and any of those embodiments may be used herein.

In 316, the AR listing generation module 106 may display the listing 110 to the seller 122A for review and editing.

In 318, after the seller 122A has edited and approved the listing 110, the listing 110 may be added to the listing database 108, and may be published on the ecommerce site 104. At that point, the listing 110 is active and may be browsed and purchased by buyers 126.

In 320, the AR listing generation module 106 may track the listing 110 while it is active on the ecommerce site 104. Using information gathered while tracking the listing 110, the AR listing generation module 106 (working with the template generation module 116) may use AI and ML computing techniques, algorithms, methods, modules, components, software and/or other technology to improve the templates 216 of the category associated with the FSO 124A. Such operation may be similar to—at least in part—the process for generating templates for a given category, which shall now be described with respect to FIG. 4.

Figure 4:
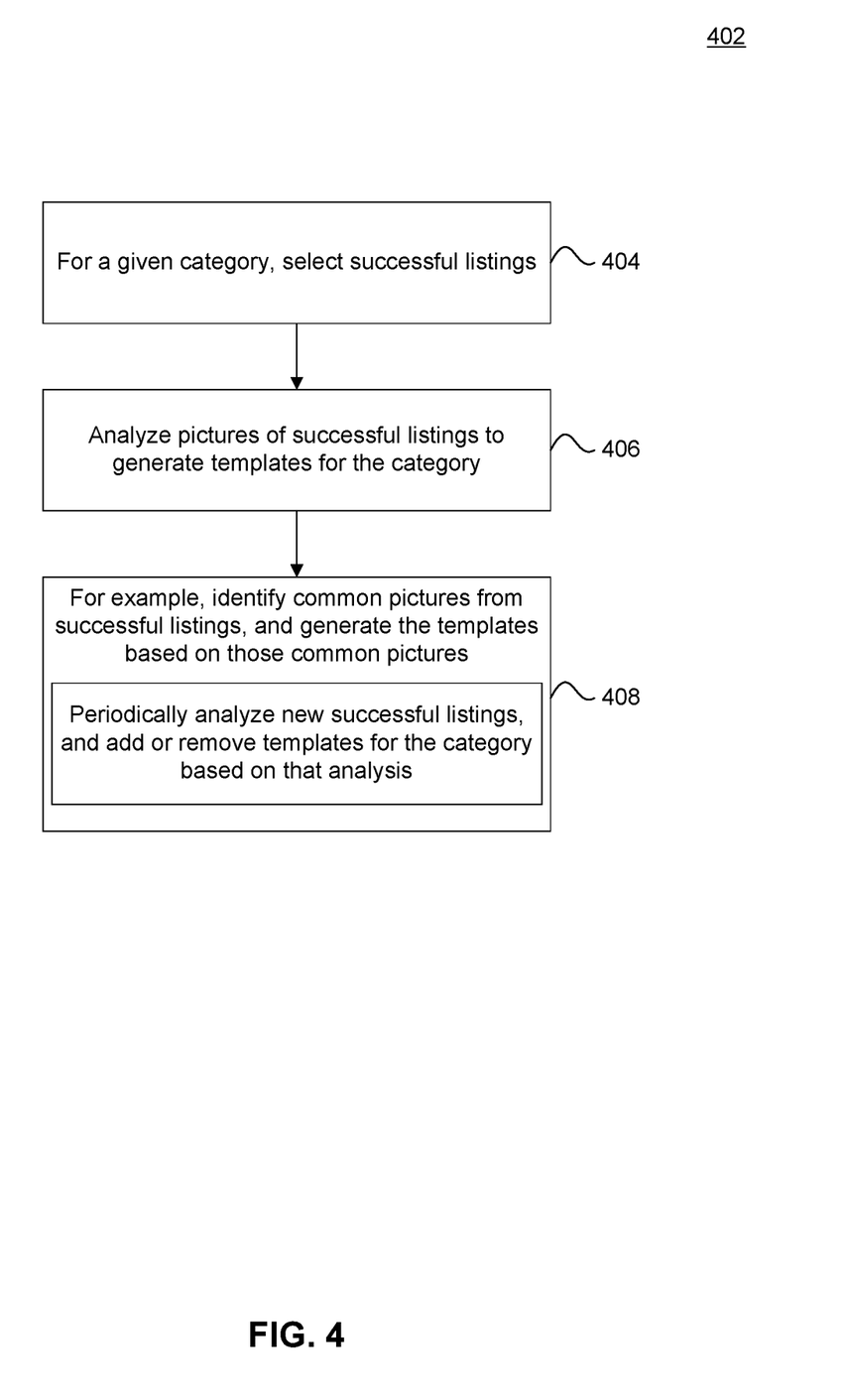
FIG. 4 illustrates a flowchart for generating and improving templates using artificial intelligence and machine learning computer technology, where the templates are used to implement the augmented reality experience described herein, according to some embodiments.

In 404, for a given category, the template generation module 116 may select certain listings 110 from the historical database 118. These certain listings 110 are for FSOs 124 that were sold. Also, these certain listings 110 are ones that were "successful," where success may be defined by any number of metrics, such as highest price achieved, shortest time to sell, high feedback from buyer, highest sellability score, small difference between initial offer price and final selling price, etc., or any combination thereof.

In 406, the template generation module 116 may analyze the pictures in these selected listings 110 to generate templates 216 for the category. For example, as indicated by 408, the template generation module 116 may identify pictures that are common to the selected listings 110, and then generate templates 216 (such as outlines of the FSOs 124 in the pictures) based on those common pictures. Examples of templates 216 for the category "woman's handbag" are shown in FIGS. 2A-2k.

As indicated in 408, in the course of tracking listings 110 (as described above in 320), the template generation module 116 may analyze the pictures in new "successful" listings 110 for a given category (where success is defined as described above) to amend or augment the templates 216 for the category.

Example Computer System

Figure 5:
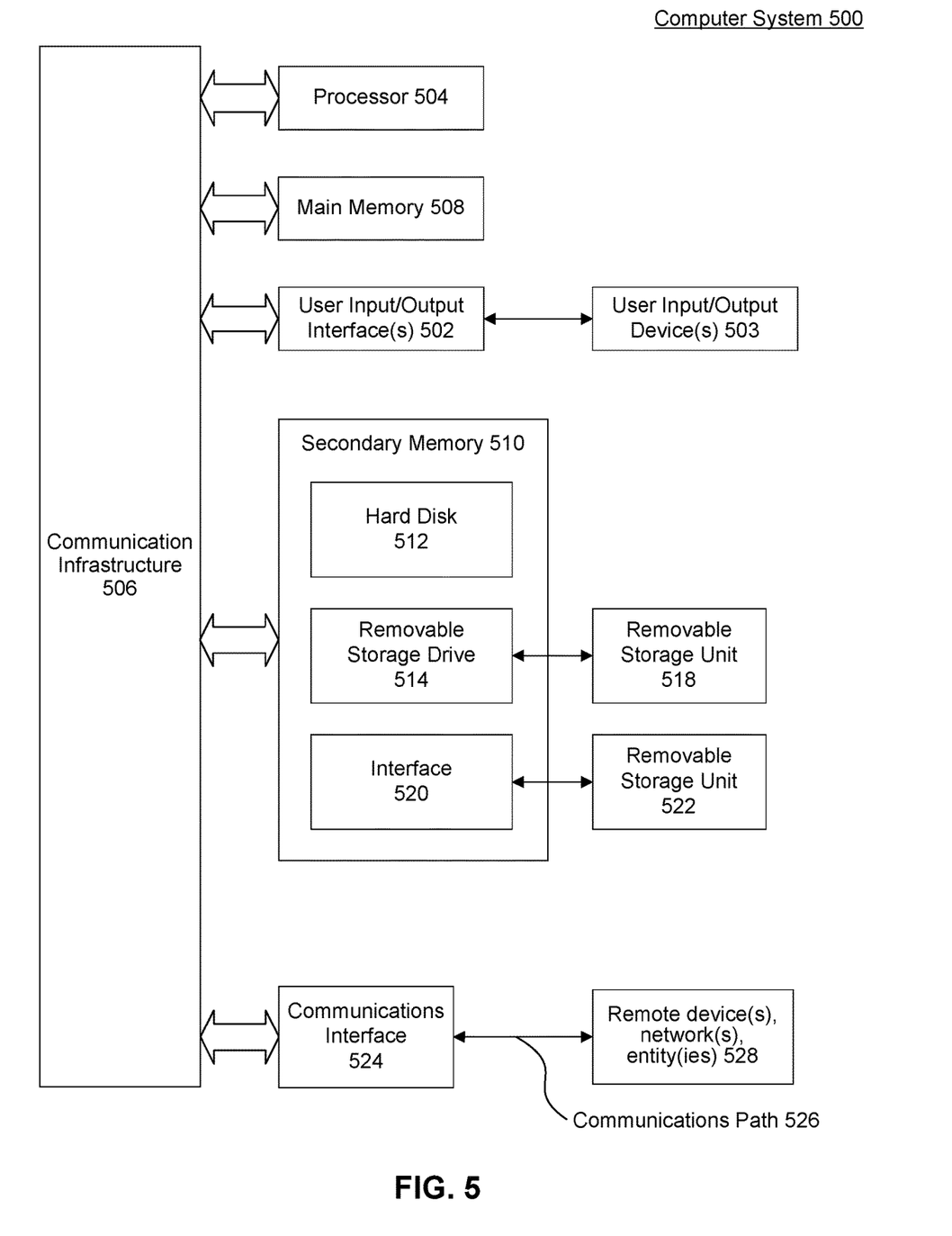
FIG. 5 illustrates an example computer system useful for implementing various embodiments.

Various embodiments and/or components therein can be implemented, for example, using one or more computer systems, such as computer system 500 shown in FIG. 5. Computer system 500 can be any computer or computing device capable of performing the functions described herein. For example, one or more computer systems 500 or portions thereof can be used to implement any embodiments described herein, and/or any combination or sub-combination thereof.

Computer system 500 includes one or more processors (also called central processing units, or CPUs), such as a processor 504. Processor 504 is connected to a communication infrastructure or bus 506.

One or more processors 504 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 can include one or more levels of cache. Main memory 508 has stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 includes a computer usable or readable storage device having stored thereon computer software (control logic) and/or data. Removable storage unit 518 can be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 can include other means, instrumentalities or other approaches for allowing computer programs and/or other instructions and/or data to be accessed by computer system 500. Such means, instrumentalities or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 enables computer system 500 to communicate and interact with any combination of remote devices, remote networks, remote entities, etc. (individually and collectively referenced by reference number 528). For example, communication interface 524 can allow computer system 500 to communicate with remote devices 528 over communications path 526, which can be wired and/or wireless, and which can include any combination of LANs, WANs, the Internet, etc. Control logic and/or data can be transmitted to and from computer system 500 via communication path 526.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
   identifying a category of a for sale object (FSO);
   selecting, by one or more processors, successful listings associated with the category from a historical database, wherein the successful listings are selected based on one or more of: a price achieved, a time to sell, a buyer feedback, a sellability score, and/or a difference between initial offer price and final selling price;
   identifying one or more common pictures in the selected listings;
   accessing templates for the category from a template database;
   selecting a first common picture of the one or more common pictures for which to navigate a user through;
   navigating, by the one or more processors, a user through a computer generated augmented reality (AR) environment using the selected first common picture to take an image of the FSO, wherein the navigating comprises providing instructions to the user though a mobile device with regard to changing a position of at least one of the FSO or a camera position of the mobile device;
   receiving, through the mobile device, an image of the FSO responsive to the instructions and in accordance with the first common picture; and
   generating, by the one or more processors, a listing for the FSO using the received image and the characteristics.

2. The method of claim 1, wherein the templates were generated from certain past listings of the category from a historical database, and wherein the certain past listings were selected based on one or more of: price achieved, time to sell, buyer feedback, sellability score, and/or difference between initial offer price and final selling price.

3. The method of claim 1, further comprising:
   tracking the listing; and
   using information obtained from the tracking to improve the templates for the category using AI and ML technology.

4. The method of claim 1, further comprising, prior to the identifying:
   generating the templates for the category.

5. The method of claim 1, wherein the navigating comprises providing the instructions for display in a window of the mobile device.

6. The method of claim 1, wherein the receiving comprises:
   determining that a position of the FSO corresponds to the first common picture.

7. The method of claim 6, further comprising:
   providing an instruction for the user to take the image of the FSO, responsive to the determination that the position of the FSO corresponds to the first common picture.

8. The method of claim 6, further comprising:
   providing a command to the mobile device to take the image of the FSO, responsive to the determination that the position of the FSO corresponds to the first common picture.

9. The method of claim 1, wherein the generating is based at least in part on one or more of the templates from the template database.

10. A non-transitory computer-readable device having instructions stored thereon that, when executed by at least one computing device, cause the at least one computing device to perform operations comprising:
    identifying a category of a for sale object (FSO);
    selecting successful listings associated with the category from a historical database, wherein the successful listings are selected based on one or more of: a price achieved, a time to sell, a buyer feedback, a sellability score, and/or a difference between initial offer price and final selling price;
    identifying one or more common pictures in the selected listings;
    accessing templates for the category from a template database;
    selecting a first common picture of the one or more common pictures for which to navigate a user through;
    navigating a user through a computer generated augmented reality (AR) environment using the selected first common picture to take an image of the FSO, wherein the navigating comprises providing instructions to the user though a mobile device with regard to changing a position of at least one of the FSO or a camera position of the mobile device;
    receiving, through the mobile device, an image of the FSO responsive to the instructions and in accordance with the first common picture;
    and
    generating a listing for the FSO using the received image and the characteristics.

11. The non-transitory computer-readable device of claim 10, wherein the templates were generated from certain past listings of the category from a historical database, and wherein the certain past listings were selected based on one or more of: price achieved, time to sell, buyer feedback, sellability score, and/or difference between initial offer price and final selling price.

12. The non-transitory computer-readable device of claim 10, the operations further comprising:

tracking the listing; and using information obtained from the tracking to improve the templates for the category using AI and ML technology.

13. The non-transitory computer-readable device of claim 10, the operations further comprising, prior to the identifying: generating the templates for the category.

14. A system, comprising:

a memory; and at least one processor coupled to the memory and configured to perform operations comprising:

identifying a category of a for sale object (FSO);

selecting successful listings associated with the category from a historical database, wherein the successful listings are selected based on one or more of: a price achieved, a time to sell, a buyer feedback, a sellability score, and/or a difference between initial offer price and final selling price;

identifying one or more common pictures in the selected listings;

accessing templates for the category from a template database;

selecting a first common picture of the one or more common pictures for which to navigate a user through;

navigating a user through a computer generated augmented reality (AR) environment using the selected first common picture to take an image of the FSO, wherein the navigating comprises providing instructions to the user though a mobile device with regard to changing a position of at least one of the FSO or a camera position of the mobile device;

receiving, through the mobile device, an image of the FSO responsive to the instructions and in accordance with the first common picture; and generating a listing for the FSO using the received image and the characteristics.

15. The system of claim 14, wherein the templates were generated from certain past listings of the category from a historical database, and wherein the certain past listings were selected based on one or more of: price achieved, time to sell, buyer feedback, sellability score, and/or difference between initial offer price and final selling price.

16. The system of claim 14, the operations further comprising:

tracking the listing; and using information obtained from the tracking to improve the templates for the category using AI and ML technology.

17. The system of claim 14, the operations further comprising, prior to the identifying:

generating the templates for the category.

* * * * *